United States Patent [19]

Chan et al.

[11] 4,334,244

[45] Jun. 8, 1982

[54] ADAPTIVE IMAGE ENHANCEMENT SYSTEM

[75] Inventors: James K. Chan, Cerritos; Curtis L. May, San Pedro; Allan Spooner, Cypress, all of Calif.

[73] Assignee: Magnavox Government and Industrial Electronics Company, Fort Wayne, Ind.

[21] Appl. No.: 173,005

[22] Filed: Jul. 28, 1980

[51] Int. Cl.³ .............................................. H04N 5/14
[52] U.S. Cl. ..................................... 358/166; 358/138
[58] Field of Search .................. 358/36, 37, 162, 166, 358/167, 282, 284, 263, 138; 328/151

[56] References Cited

U.S. PATENT DOCUMENTS 3,462,547  8/1969  Macovski ............................ 358/133
3,621,129  11/1971  Fisher ................................... 358/166
4,121,248  10/1978  Coale, Jr. ............................. 358/160

Primary Examiner—Joseph A. Orsino, Jr.
Attorney, Agent, or Firm—Christie, Parker & Hale

[57] ABSTRACT

An image enhancement system in which a running average of a group of digitized samples of a video signal and a median of a group of digitized samples are processed to form a gradient sample. The gradient sample is scaled in response to the noise level of the video signal. The gradient samples, average samples, and medium samples are combined by a processor which generates a corresponding sequence of output samples that are converted into an enhanced video signal from which an image is produced. The processor provides image edge enhancement for high gradients while providing increased noise filtering for low gradients.

9 Claims, 9 Drawing Figures

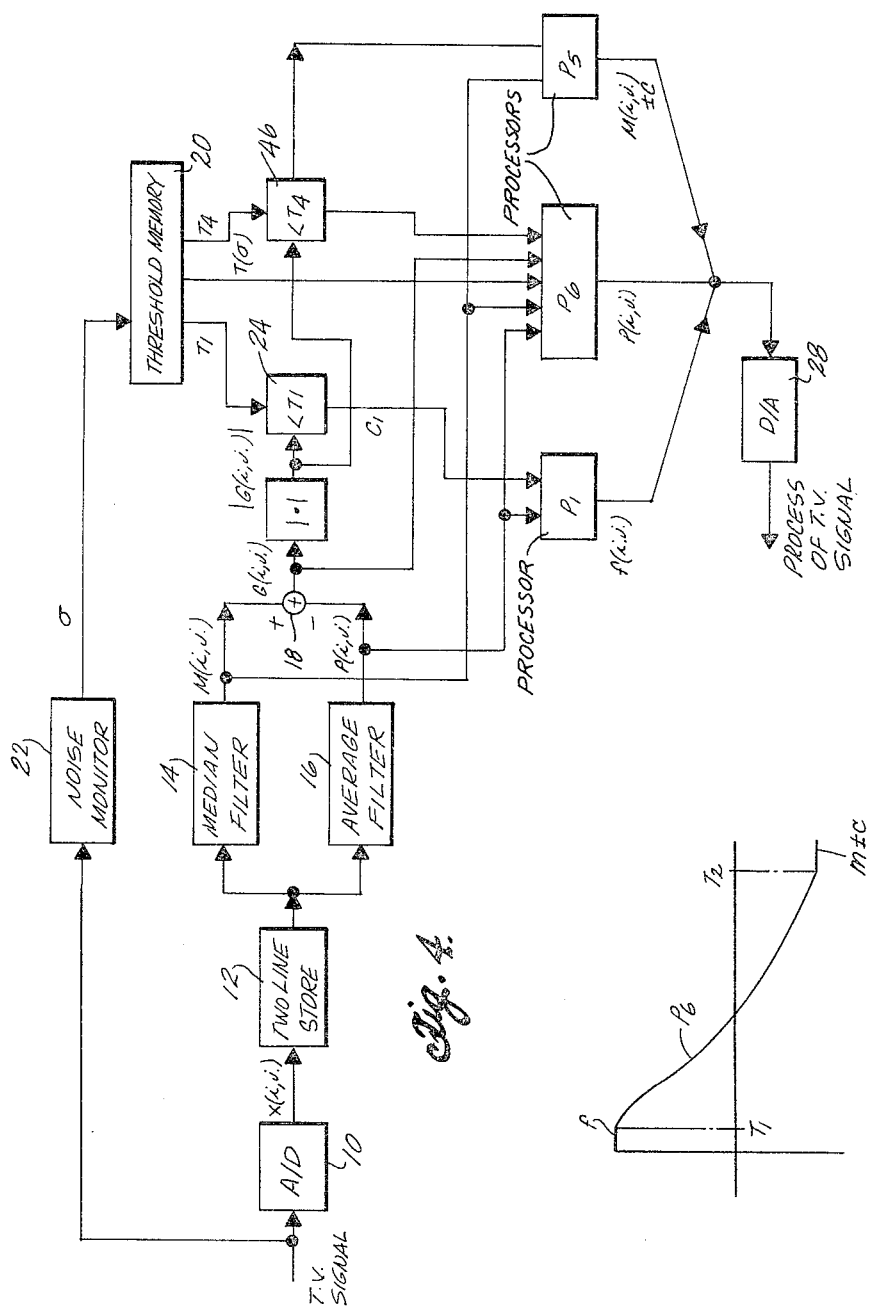

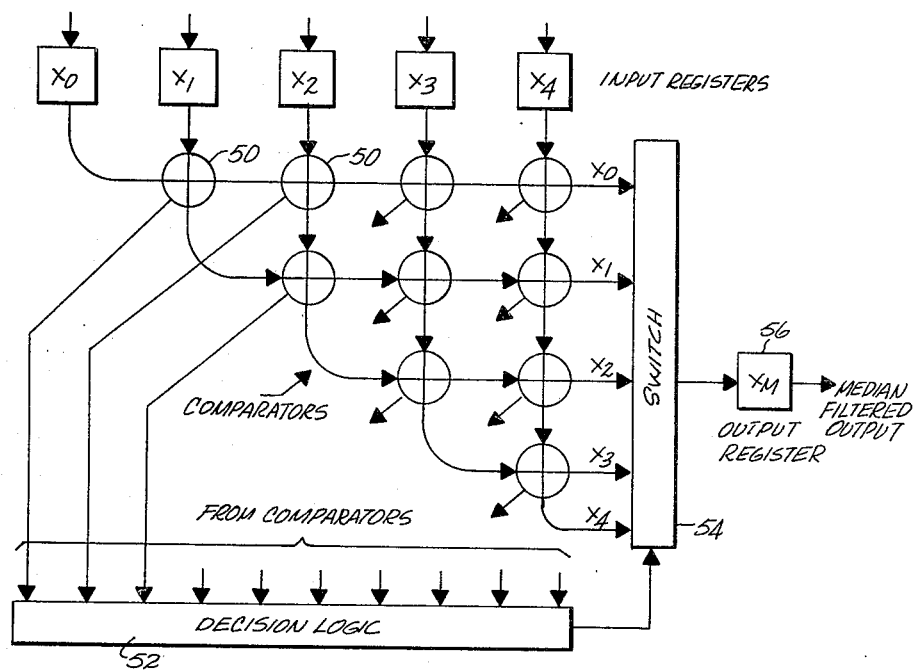

ADAPTIVE IMAGE ENHANCEMENT SYSTEM

FIELD OF THE INVENTION

This invention relates to real-time image processing systems, and more particularly, to a video signal processing system for enhancing a video image by combined noise filtering and edge sharpening.

BACKGROUND OF THE INVENTION

Altering the image signal to present the viewer additional information or insight into factors concerning the pre-enhanced image are known. For example, two useful image enhancement operations are noise reduction and edge sharpening. Various filtering techniques for reducing noise have been proposed. For example, in U.S. Pat. No. 3,009,016—Graham there is described a noise reduction system in which a running average of picture samples (pixels) is compared with each new sample of the video signal, and if the picture sample does not exceed a predetermined theshold, the average of the samples is substituted. In copending application Ser. No. 133,606 filed Mar. 24, 1980, entitled "Adaptive Enhancement of Signal-to-Noise Ratio in Television Imagery," assigned to the same assignee as the present application, there is described a refined noise reduction system which generates an average from samples over an area extending both vertically above, and horizontally back from the current sample of the video signal. While both of these arrangements improve picture quality by reducing noise in areas of the picture which have relatively low detail and uniform intensity, they provide no enhancement by sharpening the edge between regions of contrasting intensity. Noise filtering and image sharpening involve conflicting requirements since filtering to reduce noise can blur the image while circuits for enhancing image sharpness will also enhance the noise.

SUMMARY OF THE INVENTION

The present invention is directed to a video image enhancement system which adapts itself to noise filtering of the video signal in image regions of nearly uniform intensity while providing edge sharpening in a region of sharp contrast and high detail. The system adapts globally to the input signal-to-noise (SNR) ratio so that if if the noise level is very low, there is enhancement by edge sharpening of all detail, but if the noise level is high, noise filtering but no edge enhancement is provided. This global adaption to the signal-to-noise ratio is independent of picture detail. In addition, the system adapts locally to the gradient magnitude to provide either noise filtering or edge enhancement with a smooth transition between these two conditions.

The video enhancement system of the present invention is based on the concepts that human observers detect the presence of noise much easier in a nearly uniform region than near an edge, while responding more to an edge brightness difference than to the same brightness difference in regions not adjacent to each other. This suggests that by dividing the images into regions of nearly uniform brightness and regions of higher contrast, it is possible to limit noise filtering to the low contrast regions and edge sharpening to the higher contrast regions. Because such segmentation requires some kind of thresholding to define the two regions, resulting in loss in spatial resolution and introduction of artifacts, the present invention provides a system which is adaptive to image content as measured by the magnitude of the picture gradient. The degree of noise filtering is decreased gradually while the degree of edge sharpening is increased gradually as the magnitude of the gradient increases. At the same time, the rate of transition is made adaptive to the input signal-to-noise ratio of the image so that more adaptive noise filtering is performed if the image is noisier and more adaptive edge enhancement is performed if the image is cleaner.

This is accomplished by providing apparatus in which a succession of digitized samples of the video signal are generated and stored. With each new sample, a group of samples are averaged to generate an average sample while another group of samples are compared to generate the median sample of the group. Processing means generate a gradient sample corresponding to the absolute difference between the median and average samples. The gradient sample is scaled according to the noise level of the video signal independently of picture content. The scaled sample gradient is multiplied by the difference between the median and average samples and added to the average sample to generate an output sample. Successive output samples are converted to an output video signal for processing into an image.

BRIEF DESCRIPTION OF THE DRAWINGS

For a better understanding of the invention reference should be made to the accompanying drawings, wherein:

FIG. 4 is a schematic block diagram of a preferred embodiment of the present invention;

FIG. 5 is a graphical representation of the characteristics of the embodiment of FIG. 4;

FIG. 6 is a schematic block diagram of a median filter;

DETAILED DESCRIPTION

Figure 1:
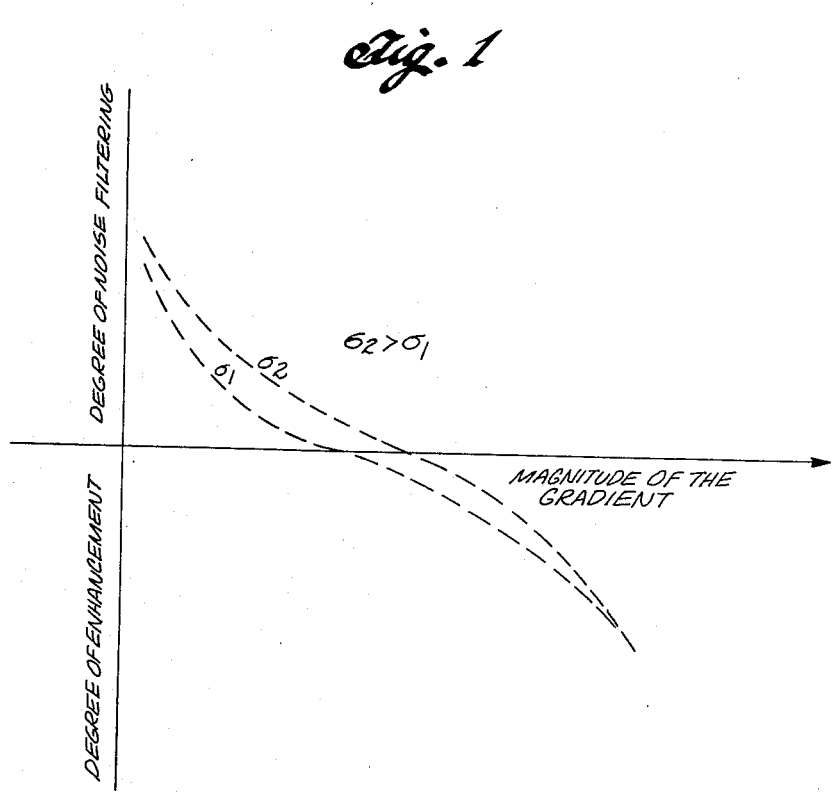
FIG. 1 is a graphical representation of the idealized characteristics of the enhancement system.

Referring to FIG. 1, there is shown the overall characteristics of a video adaptive image enhancement system having the required properties. As the picture gradient increases, the degree of average filtering to reduce noise is decreased and the degree of edge filtering increases. A family of curves for different levels of SNR, as indicated by $\sigma$, show the characteristic shifts to provide more or less average filtering while providing less or greater edge filtering as the noise level increases or decreases. It will be noted that the degree of noise filtering decreases gradually while the degree of edge sharpening increases gradually as the magnitude of the gradient increases. There is a smooth transition from the performance of the adaptive noise filter to the performance of the adaptive enhancer as the image content changes at different regions of the image. As shown by the family of curves, the rate of transition is made adaptive to the input signal-to-noise ratio of the image. Thus the curve $\sigma_1$ represents an image generated from a video signal of relatively low SNR while the curve $\sigma_2$ corresponds to a video signal of higher SNR. Thus a system having the characteristics of FIG. 1 adapts locally to the image content as measured by the gradient magnitude and globally to the input SNR of the image.

Figure 2:
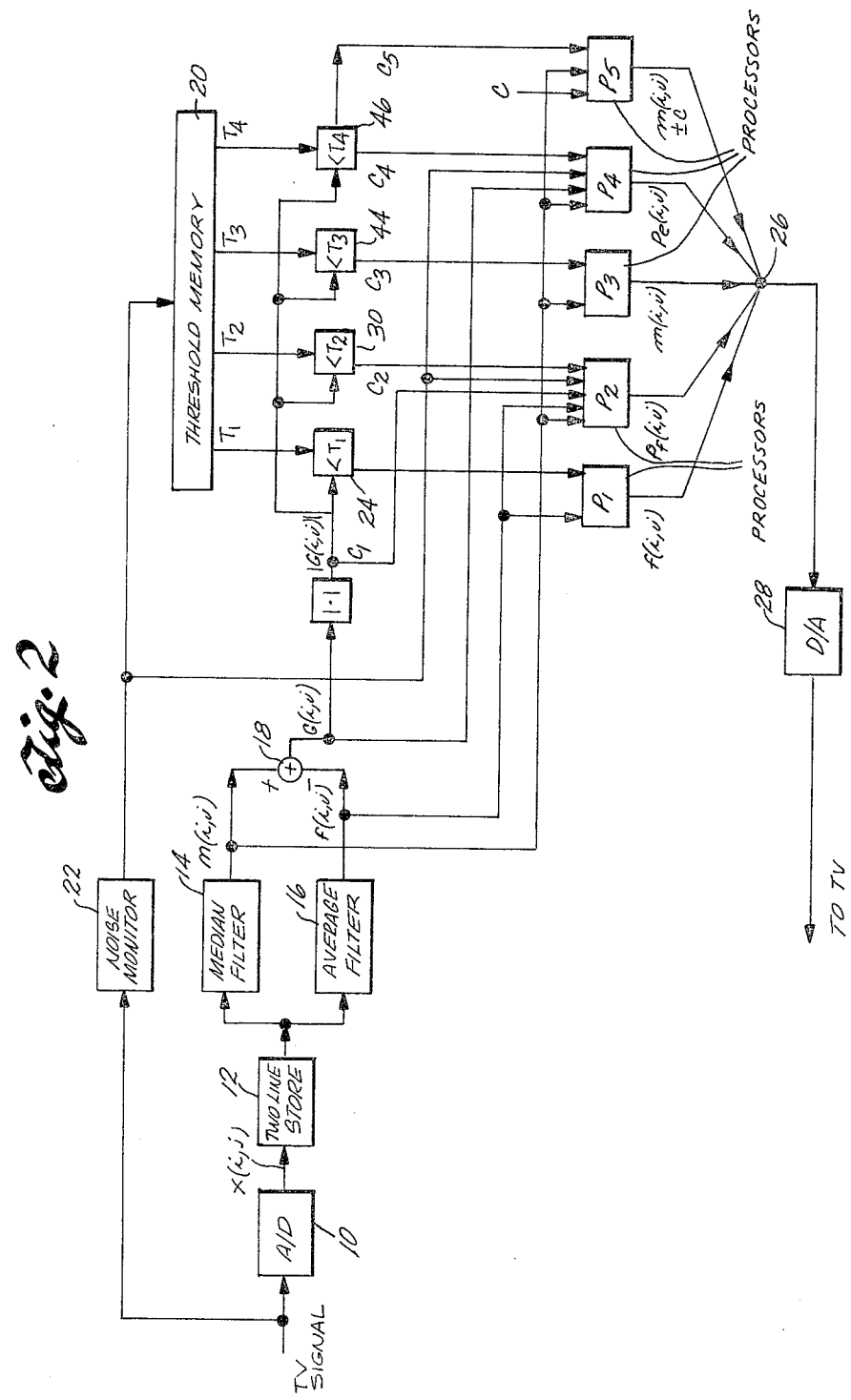
FIG. 2 is a schematic block diagram of one embodiment of the invention.
Figure 3:
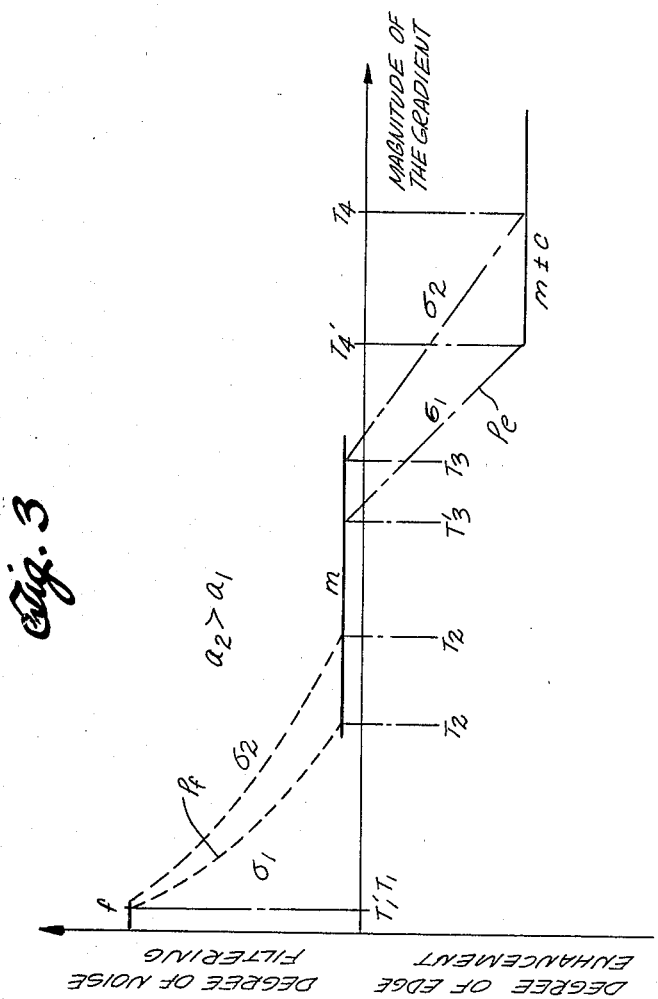
FIG. 3 is a graphical representation of the characteristics of the system of FIG. 2.

Referring to FIG. 2, there is shown a simplified block diagram of a video enhancement circuit according to the present invention which approximates the characteristics shown in FIG. 1. The performance characteristics of the circuit of FIG. 2 are shown in FIG. 3. A television video signal is applied to the input of the enhancement circuit. An analog-to-digital converter 10 quantizes the signal into a plurality of successive digitized samples or pixels. The signal amplitude represented by each pixel is defined as $x(i,j)$, where i is the number of the row or line during one complete frame of the video image and j is the number of successive samples in one line. At least two complete rows are temporarily stored in a two-line store 12, which may be a shift register. As each new sample is transferred into the register 12, a sample from at least two rows above in the image is shifted out of the register.

For each sample $x(i,j)$, a median sample $m(i,j)$ is generated by a median filter 14. The median filter looks at a group of samples in the store 12 and selects the sample point of the group which has the middle magnitude. Preferably the median filter 14 looks at five image points or pixels arranged in a cross pattern, that is, three successive points in the same row or line, and three vertical points with the center point being common to both the horizontal and vertical lines. A suitable circuit for the median filter 14 is described below in detail in connection with FIG. 6.

At the same time and operating in parallel with the median filter is an average filter 16 which generates an output sample that is the average of a group or block of the samples stored in the store 12. Various averaging patterns can be used, such as a running line average, an area average, or a more complex averaging arrangement, such as described in the above-identified patent application. The samples stored may correspond to a 3×3 pattern of image pixels. To simplify division in obtaining the average value, only eight samples are used instead of nine. This allows a division by eight, which in a binary system only requires a three digit left shift operation. The resulting output sample from the average filter 16 is designated $f(i,j)$.

The magnitude of the gradient at any point on the picture can be determined by the difference in the median sample value $m(i,j)$ and the average $f(i,j)$. The magnitude of the gradient at any point on the image is given by $G(i,j) = m(i,j) - f(i,j)$. Thus the sample gradient is obtained by a subtracting circuit 18 which subtracts the digitized output from the average filter 16 from the digitized output of the median filter 14.

The gradient magnitude provided by the output of the subtracter is used to activate one of five processing units $P_1$, $P_2$, $P_3$, $P_4$ or $P_5$ by comparing the gradient magnitude with a set of threshold values $T_1$, $T_2$, $T_3$ and $T_4$ derived from a table of threshold values stored in a threshold memory 20. Any one of a plurality of sets of four threshold values are selected, depending on the signal-to-noise ratio (SNR) of the video signal as determined by a noise monitor circuit 22. The noise monitor circuit 22, as hereinafter described in detail, generates a digitized value which is proportional to the SNR of the video input signal. In its preferred form, the noise monitor circuit utilizes the equalizing pulses of a received television signal as a reference, since the waveshape of the pulses are standardized. Any noise in the received signal can be detected as distortion of the equalizing pulse waveform. Such a noise monitoring system is described, for example, in U.S. Pat. No. 4,044,381. The output of the noise monitor circuit 22 is used to address the memory 20 to select a corresponding set of four threshold values from the table of thresholds stored in the memory 20.

The absolute value $|G(i,j)|$ of the gradient magnitude is compared with the first threshold value $T_1$ by a comparator circuit 24. If the comparator indicates that the gradient value $|G(i,j)|$ is less than the first threshold value $T_1$, it activates the processor $P_1$. The processor $P_1$ is a simple gate circuit which is activated by the output $C_1$ from the comparator circuit 24 to gate the average sample from the average filter 16 to a common terminal 26 connected to the input of a digital-to-analog converter 28. Thus the average value sample $f(i,j)$ is substituted for the input sample $x(i,j)$ in generating an enhanced TV video signal.

The absolute value $|G(i,j)|$ of the gradient is also compared by a comparator 30 with a threshold value $T_2$ which is larger than the value $T_1$. If the gradient value is equal to or greater than the threshold value $T_2$, the output of the comparator $C_2$ activates the processor $P_2$. The processor $P_2$, in response to the output $m(i,j)$ of the median filter 14, the output $f(i,j)$ of the average filter 16, the absolute value $|G(i,j)|$ of the gradient and the noise level as indicated by the output of the noise monitor 22, generates an output sample $P_f(i,j)$ according to the following relation:

$$P_f(i,j) = \frac{f(i,j) + \alpha(\sigma)|G(i,j)|m(i,j)}{1 + \alpha(\sigma)|G(i,j)|} ; |G(i,j)| < T(\sigma)$$

$\alpha(\sigma)$ is a noise factor which is a function of the SNR value $\sigma$. $T(\sigma)$ is the threshold value $T_2$ which is also a function of the SNR value $\sigma$.

Figure 7:
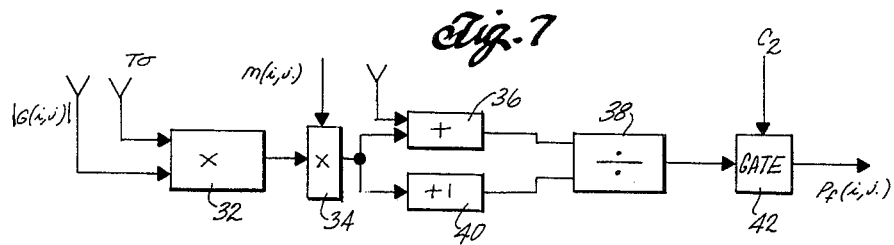
FIG. 7 is a block diagram of the processor $P_2$ of FIG. 2.

The processor $P_2$ for carrying out the function of the equation 1 is shown in FIG. 7. The absolute value $|G(i,j)|$ of the gradient is scaled by the noise factor $\alpha(\sigma)$ by a multiplier 32. The output is then multiplied by the median value $m(i,j)$ by a multiplier 34. The output of the multiplier 34 is added to the average sample value $f(i,j)$ by an adder 36 and applied to one input of a divider circuit 38. The output of the multiplier 32 is increased by one by an "add-one" circuit 40 and used as the divisor for the divider circuit 38. The output of the divider circuit 38 corresponds to the value $P_f(i,j)$ and is gated to the common terminal 26 by a gate 42 in response to the control signal $C_2$ from the comparator 30 when the gradient magnitude is greater than $T_1$ but less than $T_2$.

If the absolute value $|G(i,j)|$ of the gradient is greater than the threshold $T_2$ but less than the threshold $T_3$, a comparator 44 turns on a control signal $C_3$, activating the processor $P_3$. The processor $P_3$ is merely a gate for gating the median value $m(i,j)$ to the common terminal 26.

If the absolute value $|G(i,j)|$ of the gradient is greater than the threshold value $T_3$ but less than a threshold value $T_4$, a comparator 46 turns on a control signal $C_4$ which in turn activates the processor $P_4$ having the following characteristic:

$$P_e(i,j) = m(i,j) + \beta(\sigma)G(i,j); |G(i,j)| > T(\sigma)$$

Figure 8:
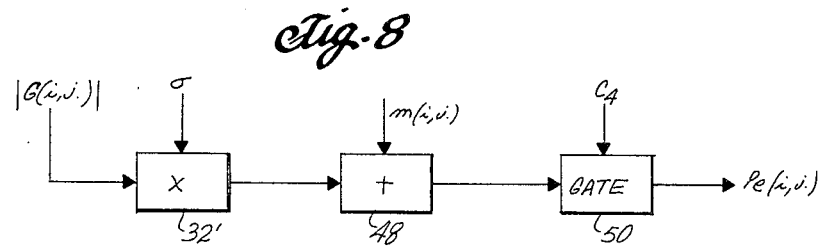
FIG. 8 is a block diagram of the processor $P_4$ of FIG. 2.

The processor P$_3$ is shown in FIG. 8. The processor P$_4$ again multiplies the absolute value |G(i,j)| of the gradient with the noise factor $\beta(\sigma)$ by a multiplier 47. The output of the multiplier 47 is added to the median value m(i,j) by an adder 48 to produce the desired edge enhanced value P$_e$(i,j). This modified sample value is gated to the common terminal 26 through a gate 50 in response to the control signal C$_4$.

Finally, if the absolute value |G(i,j)| of the gradient is greater than T$_4$, a maximum limit is set to prevent any excessive enhancement. The processor P$_5$ modifies the median value m$_{i,j}$ by adding or subtracting a constant value C and applying the output to the common terminal 26 in response to a control signal C$_5$ from the comparator 46.

The characteristics of the circuit of FIG. 2 are shown in FIG. 3. It will be seen that the characteristic of FIG. 3 is a close approximation to the desired characteristic of FIG. 1. From FIG. 3 it will be seen that if the magnitude of the gradient is below T$_1$, the output sample corresponding to the average value f(i,j). Between T$_1$ and T$_2$, the adaptive noise filter sample value P$_f$ is used, which reduces the degree of noise filtering as the magnitude of the gradient increases. Once the magnitude of the gradient exceeds the threshold T$_2$, the output sample of the median filter is used as the output sample, resulting in less noise filtering but improved edge detail. With the magnitude of the gradient between the range of T$_3$ and T$_4$, the edge enhanced sample P$_e$, which varies with the change in the magnitude of the gradient, is used as the output sample. Finally, a maximum degree of edge enhancement is provided by using the m(i,j)±C as the sample output. FIG. 3 shows two different sets of thresholds, T and T', corresponding to two different levels of noise, $\sigma_1$ and $\sigma_2$.

A preferred embodiment is shown in FIG. 4 in which a single processor P$_6$ provides a modified sample value that provides both noise filtering and edge enhancement of the resulting image. The circuit is otherwise the same as the arrangement in FIG. 2 except that the threshold memory provides only two threshold values, T$_1$ and T$_4$. Processor P$_6$ is activated between the full gradient range from T$_1$ to T$_4$. The processor P$_6$ provides a combined noise filtering and edge enhancement according to the following relation:

$$P(i,j) = f(i,j) + \frac{|G(i,j)|}{T(\sigma)} G(i,j)$$

Figure 9:
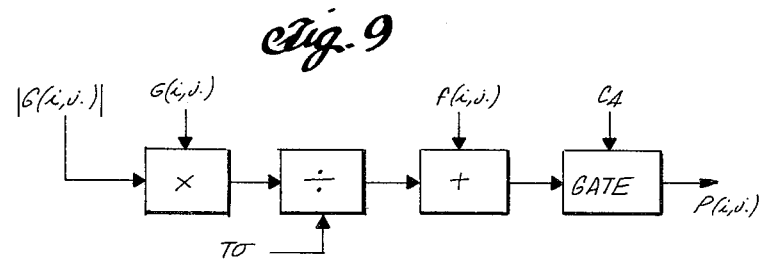
FIG. 9 is a block diagram of the processor $P_6$ of FIG. 4.

For a fixed SNR, the absolute value |G(i,j)| of the gradient acts as a non-linear adaptive gain factor which changes P(i,j) from P$_f$(i,j) to P$_e$(i,j) smoothly as the gradient increases. Since T($\sigma$) increases as $\sigma$ increases, this gain factor is de-emphasized as the input picture gets noisier. FIG. 9 shows a block diagram of processor P$_6$.

The performance of the circuit depends largely on the size of the averaging and the median filters. For example, averaging a block of n×n pixels gives an improvement in SNR of 20 log$_{10}$ (n). The larger that n is, the better is the noise filtering. With n=3, that is, averaging a 3×3 matrix of pixels, the noise filtering is improved by about 9.5 db. Performance of the median filter depends on both the size and the shape of the block of pixels used. Increasing the number increases the noise filtering but produces a greater loss of spatial resolution. Five pixels arranged in a cross has been found to produce satisfactory results.

One embodiment of a median filter is shown in the block diagram of FIG. 6. The five samples from the cross-shaped block, designated x$_0$, x$_1$, x$_2$, x$_3$ and x$_4$, are applied to a group of comparator circuits 50 from the store 12. Ten comparison circuits are required to compare each of the five samples with each of the other samples. Each comparator provides a binary coded output in which 0 represents less than and 1 represents greater than or equal. The ten binary bits from the ten comparators are applied to a decision logic circuit 52 which determines which of the five input samples is in the middle of the five samples. The decision logic sets a switch to connect the median value of the input samples to an output register 56. The concept of a median filter has been described in the literature. See, for example, "Nonlinear (Nonsuperposable) Methods for Smoothing Data" by J. W. Tukey, Comp. Rec., 1974 EASCON, p. 673.

The averaging filter, in its simplest form, sums a group of the stored points, preferably arranged in a block, and divides by the number of points to generate an average value. An alternative averaging circuit is described in copending application Ser. No. 133,606 filed Mar. 24, 1980, entitled "Adaptive Enhancement of Signal-to-Noise Ratio in Television Imagery" by Curtis May and assigned to the same assignee as the present application.

From the above description it will be seen that a circuit is provided which provides both noise filtering and edge enhancement in the same image. The degree of noise filtering and edge enhancement adapts locally to image content and globally to the SNR of the image. As a result, degradation in spatial resolution or the introduction of artifacts such as "contouring" and "salt-and-pepper" effects are minimized. The averaging filter and the median filter can be tailored depending on application areas, giving the system considerable flexibility. Minimum storage is required and real-time operation for a TV system is no problem.

What is claimed is:

1. Apparatus for enhancing the image produced from a received video signal, comprising: means sampling the video signal at a predetermined rate to provide a succession of coded samples indicating the instantaneous amplitude of the video signal with each sampling, memory means storing a plurality of said coded samples, means inserting the coded samples into the memory means with each successive sampling of the video signal, means generating an average sample corresponding to the average of a predetermined group of samples stored in the memory means in response to each sampling of the video signal, means generating a median sample corresponding to the median of a predetermined group of samples stored in the memory means in response to each sampling of the video signal, subtraction means for generating a gradient sample with each sampling of the video signal corresponding to the median sample minus the average sample, processing means responsive to the average sample and the gradient sample for generating an output sample proportional to the sum of the average sample and the product of the gradient sample and the absolute value of the gradient sample, and means converting successive output samples to an output video signal.

2. Apparatus of claim 1 further including means responsive to the received video signal for generating a noise signal indicative of the signal-to-noise ratio of the received video signal, and means scaling the product of the gradient sample and the absolute value of the gradient sample by an amount inversely related to the level of said noise signal.

3. Apparatus of claim 2 further including means generating a gradient threshold signal, means comparing the absolute value of the gradient sample with said threshold signal, the processing means including means for generating an output sample equal to the average sample when the absolute value of the gradient sample is less than said threshold signal.

4. Apparatus for enhancing the quality of an image produced from an input video signal, comprising:

analog-to-digital converter receiving the video signal and converting the signal to a succession of digital samples of the video signal, means storing a plurality of said digital samples, means selecting a first predetermined group of stored digital samples for generating a median sample corresponding in magnitude to the median value of said first group of stored digital samples in response to each new digital sample of the video signal, means selecting a second predetermined group of stored digital samples for generating an average sample corresponding in magnitude to the average value of said second group of stored samples in response to each new digital sample of the video signal, digital processing means for selecting one of a plurality of possible output samples in response to each average sample and each median sample, each of the possible output samples being dependent on the changes in the magnitude of the difference between the median sample and the average sample, and a digital-to-analog converter for converting the output samples of said digital processing means back to an output video signal.

5. Apparatus of claim 4 further including noise monitoring means responsive to the input video signal for generating a noise signal corresponding to and varying with the level of noise in the video signal, the processing means including means for scaling the output samples of said digital processing means in response to the noise signal.

6. Apparatus of claim 4 further including means for generating a threshold signal, and means comparing the threshold signal with the difference between the median signal and the average signal for gating the average sample directly to the digital-to-analog converter in place of the output sample from the processing means when said difference is below the level of said threshold signal.

7. Apparatus of claim 6 further including means responsive to the noise signal for varying the level of the threshold signal with changes in the noise level.

8. Apparatus of claim 4 wherein the processing means includes means multiplying said difference between the median sample and the average sample with the absolute value of said difference, and means adding the output of the multiplying means to the average sample to generate the output sample from the processing means.

9. Apparatus of claim 7 wherein the processing means includes means multiplying said difference between the median sample and the average sample with the absolute value of said difference, means scaling the output of the multiplying means in response to the noise signal, and means adding the output of the multiplying means to the average sample to generate the output sample.

* * * * *